(12) United States Patent
Sugimoto et al.

(10) Patent No.: US 10,161,301 B2
(45) Date of Patent: Dec. 25, 2018

(54) EXHAUST DEVICE FOR SUPERCHARGED ENGINE

(71) Applicant: MAZDA MOTOR CORPORATION, Hiroshima (JP)

(72) Inventors: Manabu Sugimoto, Hiroshima (JP); Atsuhiro Hatabu, Hiroshima (JP); Hideya Horii, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/256,761

(22) Filed: Sep. 6, 2016

(65) Prior Publication Data

US 2017/0082015 A1 Mar. 23, 2017

(30) Foreign Application Priority Data

Sep. 18, 2015 (JP) ................................. 2015-185171

(51) Int. Cl.
*F02B 37/00* (2006.01)
*F02B 37/007* (2006.01)
(Continued)

(52) U.S. Cl.
CPC ............ *F02B 37/007* (2013.01); *F01N 3/021* (2013.01); *F01N 3/103* (2013.01); *Y02T 10/144* (2013.01)

(58) Field of Classification Search
CPC ...... F02B 37/007; F02B 37/013; F01N 3/021; F01N 3/103; F01N 13/10; F01N 13/1805;
(Continued)

(56) References Cited

U.S. PATENT DOCUMENTS

| 4,194,484 A | * | 3/1980 | Kirchweger | ............ F02B 77/13 |
| | | | | 123/195 C |
| 7,806,110 B1 | * | 10/2010 | Broman | .................. F02B 67/10 |
| | | | | 123/196 W |

(Continued)

FOREIGN PATENT DOCUMENTS

| EP | 2256314 A1 * | 12/2010 | ............. F01N 13/10 |
| JP | 2006194227 A * | 7/2006 | ........... F01N 13/001 |

(Continued)

OTHER PUBLICATIONS

An Office Action; "Notification of Reasons for Refusal," issued by the Japanese Patent Office dated Jan. 9, 2018, which corresponds to Japanese Patent Application No. 2015-185171 and is related to U.S. Appl. No. 15/256,761; with English language translation.

*Primary Examiner* — Jason Newton
(74) *Attorney, Agent, or Firm* — Studebaker & Brackett PC (57) ABSTRACT

An exhaust device is configured to flow exhaust gas to be discharged from each of cylinders of an engine body. The engine body includes the cylinders arrayed in a row. The exhaust device includes an exhaust passage extending in the cylinder array direction; an exhaust outlet portion connected to an end of the exhaust passage in the cylinder array direction; a supercharger disposed at an end of the engine body in the cylinder array direction, and connected to the exhaust outlet portion; a lateral exhaust pipe connected to the supercharger, and disposed along a lateral surface of the engine body in the cylinder array direction; and an exhaust gas purification device disposed midway in the lateral exhaust pipe.

4 Claims, 7 Drawing Sheets

(51) Int. Cl.
  *F01N 3/021* (2006.01)
  *F01N 3/10* (2006.01)
(58) Field of Classification Search
  CPC ............ Y02T 10/144; F02F 2001/4278; F02F 1/4264; F02F 1/243; F02F 1/42
  USPC .................................................. 60/323, 612
  See application file for complete search history.

(56) References Cited

U.S. PATENT DOCUMENTS

| | | | | |
|---|---|---|---|---|
| 2011/0000470 A1* | 1/2011 | Roth | .................... | F02D 13/0249 123/568.11 |
| 2011/0023480 A1* | 2/2011 | Chyo | .................... | F01N 3/0842 60/602 |
| 2012/0000196 A1* | 1/2012 | Niwa | .................... | F02B 37/013 60/602 |

FOREIGN PATENT DOCUMENTS

| | | | | | |
|---|---|---|---|---|---|
| JP | 2008-101530 A | | 5/2008 | | |
| JP | 2010-261362 A | | 11/2010 | | |
| JP | 2010261362 A | * | 11/2010 | ........... | Y02T 10/144 |
| JP | 2012057519 A | * | 3/2012 | ........... | H01M 2/1016 |
| JP | 2015-059559 A | | 3/2015 | | |
| JP | 2015059559 A | * | 3/2015 | ........... | Y02T 10/121 |
| WO | WO 2012087907 A2 | * | 6/2012 | ............... | F01D 9/02 |

\* cited by examiner

EXHAUST DEVICE FOR SUPERCHARGED ENGINE

FIELD OF THE INVENTION

The present invention relates to an exhaust device for a supercharged engine.

BACKGROUND ART

Japanese Unexamined Patent Publication No. 2008-101530 discloses an exhaust device for a supercharged engine including an exhaust outlet port formed in a lateral surface of each bank of a V-shaped engine in the cylinder array direction; a supercharger connected to each of the exhaust outlet ports; an exhaust pipe extending from each of the superchargers toward the rear side in the vehicle front-rear direction, and configured that downstream ends of the superchargers are connected to each other; a collecting pipe extending from a connecting portion of the exhaust pipes toward the rear side in the vehicle front-rear direction; and an exhaust gas purification device provided at the collecting pipe.

In the exhaust device for a supercharged engine described in the publication, the exhaust gas purification device is disposed far away from the engine toward the rear side in the vehicle front-rear direction. Therefore, the temperature of exhaust gas may be lowered before the exhaust gas reaches the exhaust gas purification device. As a result, the exhaust gas purification device may not exhibit a sufficient purification performance. Further, it is necessary to dispose an exhaust gas purification device below a floor panel of a vehicle body, and it is necessary to bulge the floor panel toward the inside of a vehicle compartment in order to secure an installation space of the exhaust gas purification device. This may reduce the space for the vehicle compartment.

In view of the above, there is proposed an idea of shortening the distance between an engine and an exhaust gas purification device by installing the exhaust gas purification device laterally of the engine to prevent lowering of the temperature of exhaust gas.

However, in order to install an exhaust gas purification device laterally of an engine, it is necessary to install the exhaust gas purification device in a space along a lateral surface of the engine while avoiding interference with a supercharger and an exhaust pipe (i.e. a duct for connecting the supercharger and the engine). This may limit the installation space of the exhaust gas purification device, and it may be impossible to sufficiently secure the installation space.

SUMMARY OF THE INVENTION

In view of the above, an object of the present invention is to provide an exhaust device for a supercharged engine that enables to sufficiently secure an installation space of an exhaust gas purification device when the exhaust gas purification device is installed laterally of the supercharged engine.

In order to solve the aforementioned drawbacks, the present invention provides an exhaust device for a supercharged engine configured to flow exhaust gas to be discharged from each of a plurality of cylinders of an engine body. The engine body includes the cylinders arrayed in a row. The exhaust device includes an exhaust passage extending in the cylinder array direction; an exhaust outlet portion connected to an end of the exhaust passage in the cylinder array direction; a supercharger disposed at an end of the engine body in the cylinder array direction, and connected to the exhaust outlet portion; a lateral exhaust pipe connected to the supercharger, and disposed along a lateral surface of the engine body in the cylinder array direction; and an exhaust gas purification device disposed midway in the lateral exhaust pipe.

According to the present invention, it is possible to sufficiently secure an installation space of an exhaust gas purification device when the exhaust gas purification device is installed laterally of a supercharged engine.

These and other objects, features and advantages of the present invention will become more apparent upon reading the following detailed description along with the accompanying drawings.

DESCRIPTION OF EMBODIMENTS

In the following, preferred embodiments of the present invention are described referring to the drawings.

(First Embodiment)

In the following description, an array direction of a plurality of cylinders is referred to as the cylinder array direction. Further, a side in the cylinder array direction where a transmission (a transmission unit) is disposed is referred to as the engine rear side, and a side opposite to the engine rear side is referred to as the engine front side.

An engine (see FIG. 1 to FIG. 4) to which an exhaust device according to the first embodiment is applied is a diesel engine to be mounted in a vehicle such as an automobile. An engine body 1 of the engine is of an in-line 4-cylinder type. The engine body 1 includes four cylinders 27 arrayed in a row.

Figure 2:
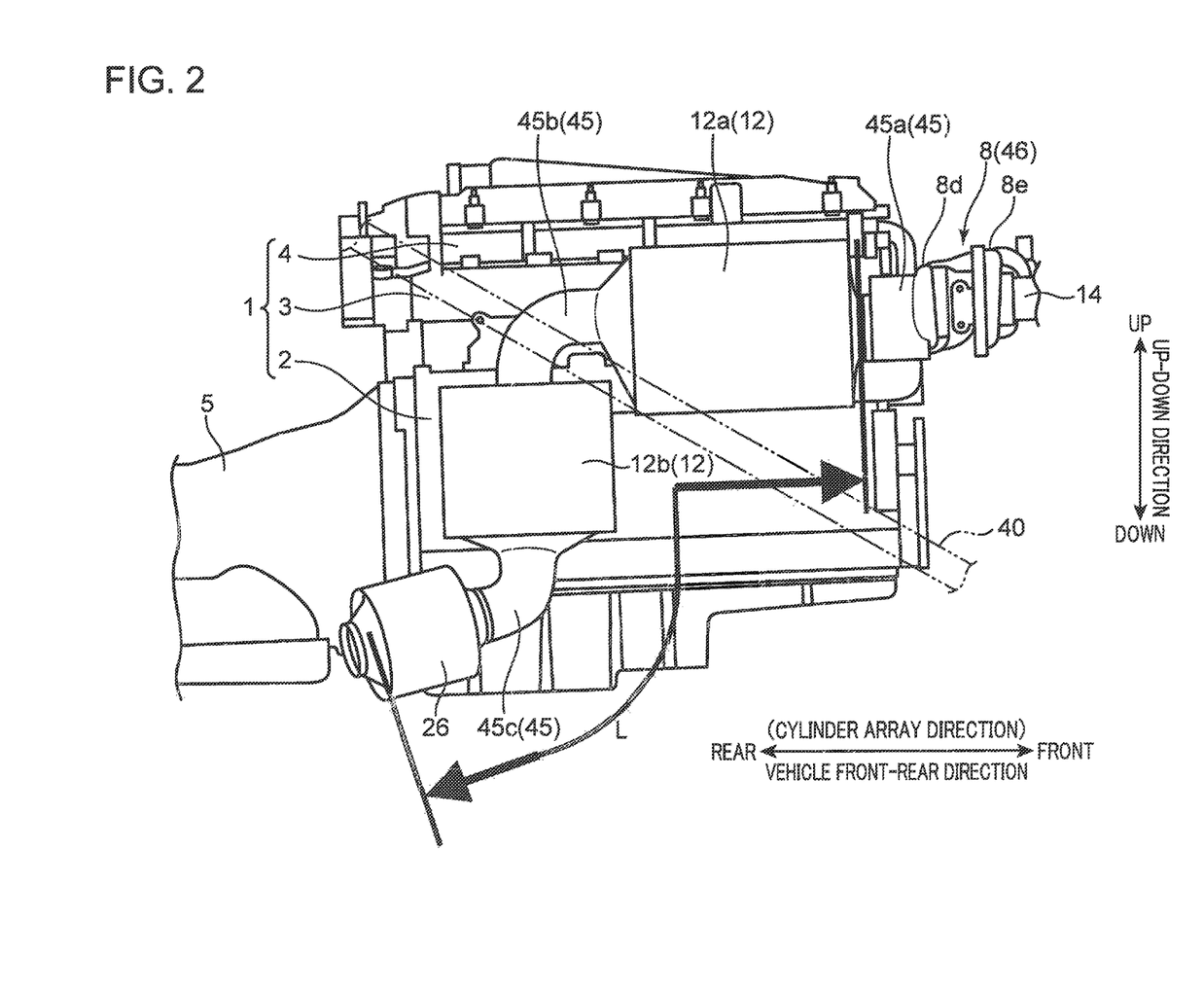
FIG. 2 is a side view of the exhaust device for a supercharged engine according to the first embodiment of the present invention when viewed from the exhaust side.
Figure 3:
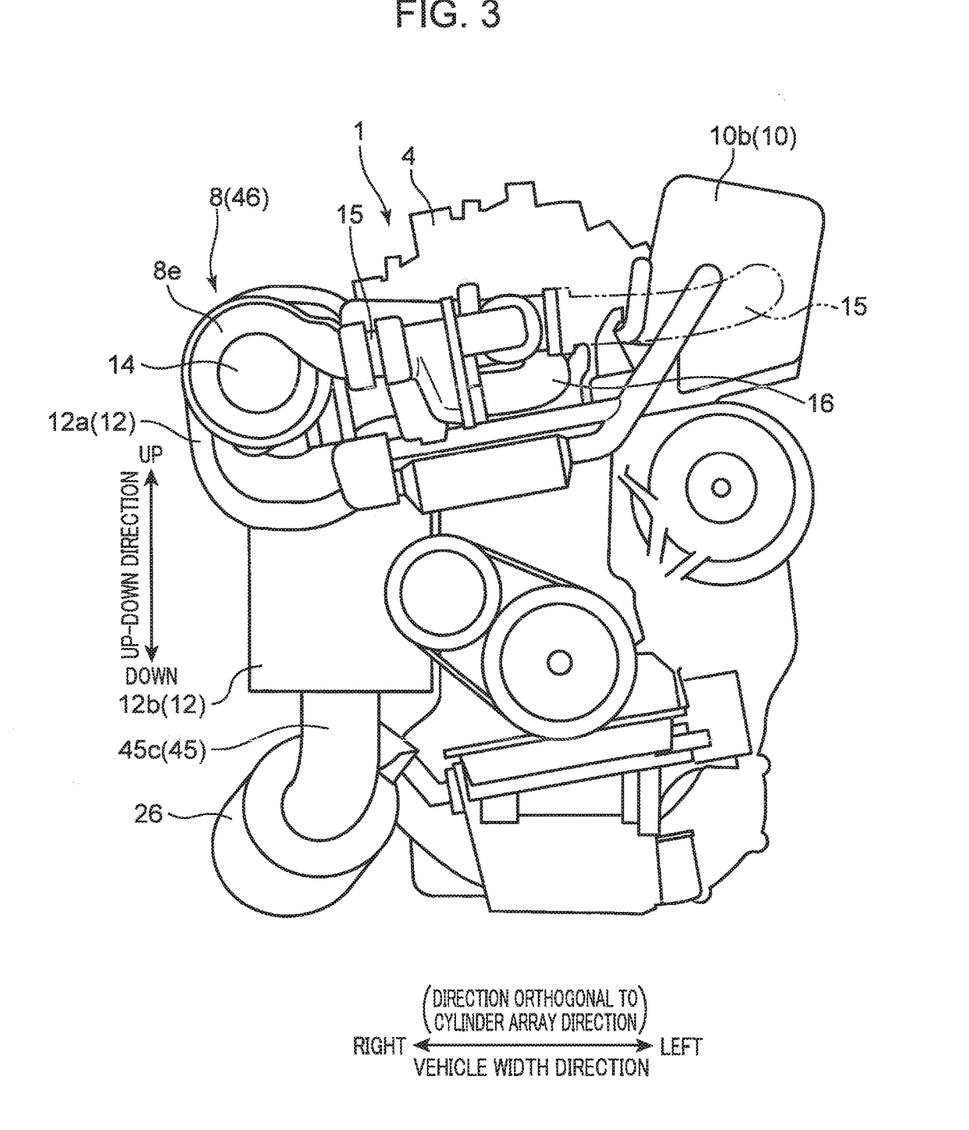
FIG. 3 is a side view of the exhaust device for a supercharged engine according to the first embodiment of the present invention when viewed from one side in the cylinder array direction (from the engine front side)

As illustrated in FIG. 2, the engine body 1 includes a cylinder block 2, a cylinder head 3 disposed above the cylinder block 2, and a cylinder head cover 4 for covering the upper portion of the cylinder head 3. A transmission unit 5 is mounted on the rear side of the cylinder block 2 in the vehicle front-rear direction. Intake ports 32 (see FIG. 4) and an exhaust port 11 are formed in the cylinder head 3. The engine body 1 is disposed in a vertical posture in an engine room in the front portion of a vehicle in a state that the intake ports 32 (see FIG. 4) are located on the left side of the vehicle, and the exhaust port 11 is located on the right side of the vehicle (in a state that the cylinder array direction is aligned with the vehicle front-rear direction).

Figure 4:
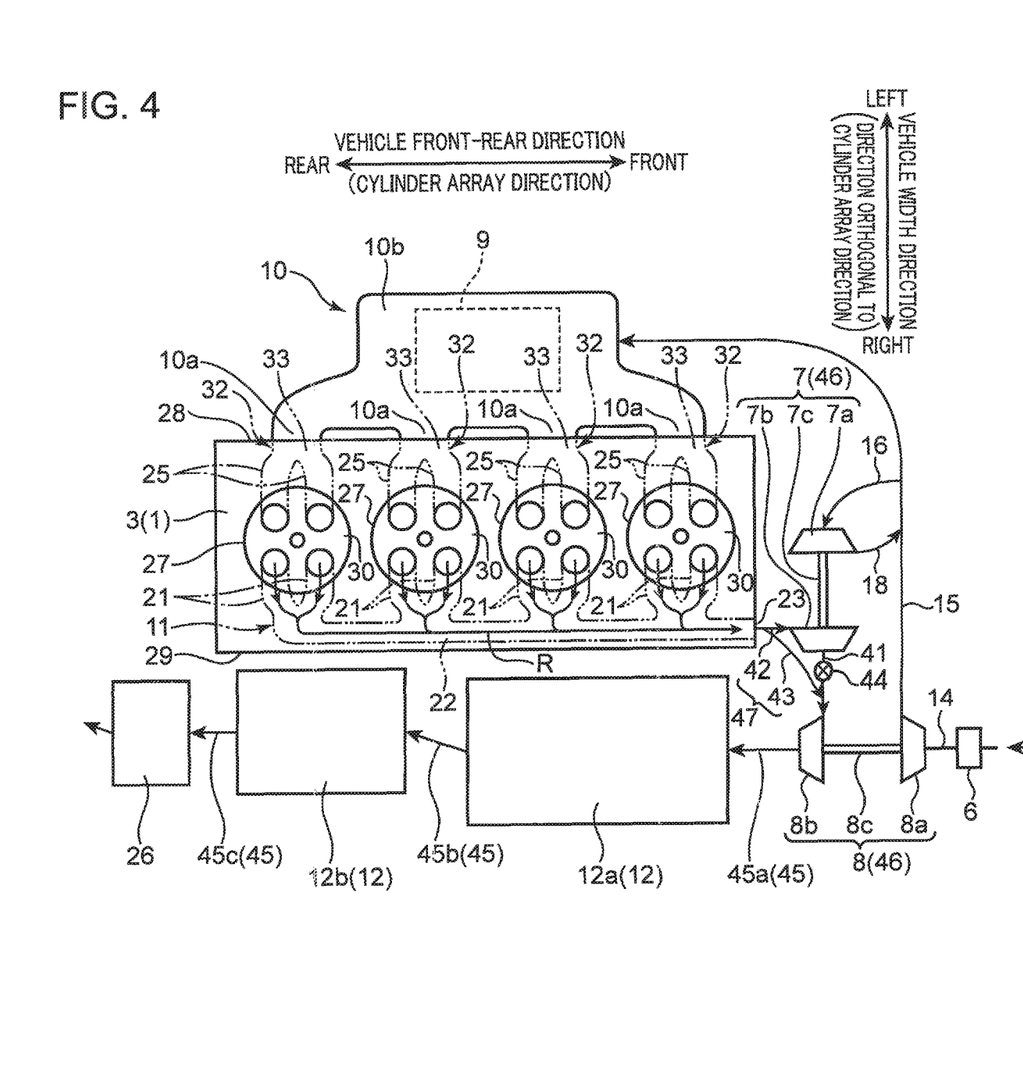
FIG. 4 is a plan view schematically illustrating the exhaust device for a supercharged engine according to the first embodiment of the present invention.

As illustrated in FIG. 4, a combustion chamber 30 is formed in each of the cylinders 27 of the cylinder head 3. Two intake valve holes located at the downstream end of the intake port 32 in the intake flow direction, and two exhaust valve holes located at the upstream end of the exhaust port 11 in the exhaust flow direction are formed in each of the combustion chambers 30. Thus, a DOHC engine provided with 2 intake 2 exhaust valves is configured.

The intake port 32 is formed independently for each of the cylinders 27. Each of the intake ports 32 is branched into V-shape (into two parts) from the downstream side in the intake flow direction toward the upstream side in the intake flow direction. Specifically, each of the intake ports 32 includes one upstream-side intake port portion 33 which is opened toward a lateral surface 28 of the cylinder head 3 in the cylinder array direction (in the example illustrated in FIG. 4, the left surface of the cylinder head 3 in the vehicle width direction); and two downstream-side intake port portions 25, whose upstream end in the intake flow direction communicates with the upstream-side intake port portion 33, and whose downstream end in the intake flow direction communicates with the combustion chamber 30.

Figure 1:
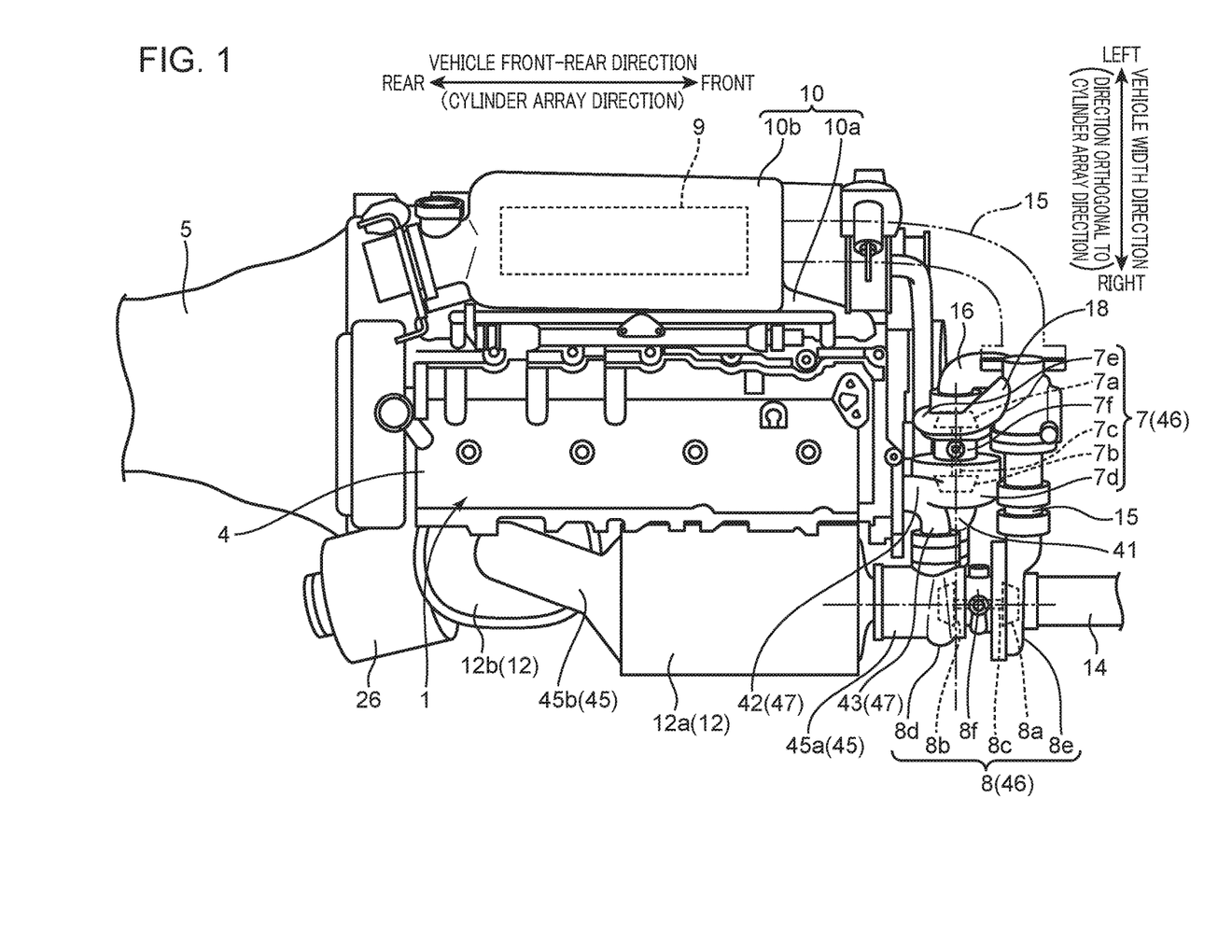
FIG. 1 is a plan view illustrating an exhaust device for a supercharged engine according to a first embodiment of the present invention.

As illustrated in FIG. 1 and FIG. 4, the upstream end of each of the intake ports 32 in the intake flow direction is connected to an intake manifold 10 for introducing intake air into each of the intake ports 32. The upstream end of the intake manifold 10 is connected to the downstream end of an intake inlet pipe 15. The upstream end of the intake inlet pipe 15 is connected to the downstream end of a second compressor housing 8e (see FIG. 1) for accommodating a second compressor 8a to be described later. Further, the upstream end of the second compressor housing 8e is connected to the downstream end of an intake inlet pipe 14, which is disposed on the upstream side than the intake inlet pipe 15 in the intake flow direction. An air cleaner 6 for removing dust in intake air is provided in the intake inlet pipe 14.

The exhaust device according to the embodiment includes the exhaust port 11, an exhaust outlet portion 47 (see FIG. 1 and FIG. 4) connected to an end of the exhaust port 11 in the cylinder array direction, a turbocharger 46 disposed at one end of the engine body 1 in the cylinder array direction and connected to the exhaust outlet portion 47, a lateral exhaust pipe 45 connected to the turbocharger 46 and disposed along an exhaust-side lateral surface 29 of the engine body 1 in the cylinder array direction, and an exhaust gas purification device 12 disposed midway in the lateral exhaust pipe 45.

The turbocharger 46 is a supercharger capable of performing single stage supercharging and dual stage supercharging. The turbocharger 46 includes a first turbocharger 7, and a second turbocharger 8 disposed on the downstream side than the first turbocharger 7 in the exhaust flow direction. The lateral exhaust pipe 45 includes, in the order from the upstream side in the exhaust flow direction, an exhaust inlet portion 45a, a purification device connecting portion 45b, and a flexible exhaust pipe connecting portion 45c. The exhaust purification device 12 includes, in the order from the upstream side in the exhaust flow direction, a first exhaust gas purification device 12a and a second exhaust gas purification device 12b.

A compressor upstream pipe 16 for guiding intake air to a first compressor 7a of the first turbocharger 7, and a compressor downstream pipe 18 for returning intake air pressurized by the first compressor 7a to the intake inlet pipe 15 are respectively connected to the intake inlet pipe 15 at appropriate positions. The upstream end of the compressor upstream pipe 16 in the intake flow direction is connected to the downstream side of the compressor downstream pipe 18 in the intake flow direction with respect to the intake inlet pipe 15.

The intake manifold 10 includes four independent intake passages 10a to be connected to upstream ends of the four upstream-side intake port portions 33 in the intake flow direction, and a surge tank 10b extending in the cylinder array direction and connected to the upstream end of each of the independent intake passages 10a. The surge tank 10b is internally provided with a water-cooled intercooler 9 for cooling intake air, whose temperature is raised high by being pressurized by the first compressor 7a and by the second compressor 8a to be described later.

The exhaust port 11 includes a plurality of upstream-side exhaust port portions 21, each of which is formed for each of the cylinders 27, and is branched into Y-shape (into two parts) on the upstream side in the exhaust flow direction; and one downstream-side exhaust port portion 22 (corresponding to an exhaust passage of the present invention) extending in the cylinder array direction and communicating with the downstream end of each of the upstream-side exhaust port portions 21 in the exhaust flow direction. The downstream-side exhaust port portion 22 is an exhaust passage for collecting the upstream-side exhaust port portions 21. The downstream end of the downstream-side exhaust port portion 22 in the exhaust flow direction is opened toward a lateral surface of the cylinder head 3 in the direction orthogonal to the cylinder array direction (toward a lateral surface of the cylinder head 3 on the engine front side). In other words, the exhaust port 11 in the embodiment has a function of an exhaust manifold for collecting exhaust gas from each of the cylinders 27. In the following, the downstream end of the downstream-side exhaust port portion 22 in the exhaust flow direction is referred to as an exhaust outlet port 23. The exhaust outlet port 23 is formed in the front end of the engine body 1, and discharges exhaust gas toward the engine front side (toward one side in the cylinder array direction) (see FIG. 4).

As illustrated in FIG. 1 and FIG. 4, the exhaust outlet port 23 is connected to the upstream end of the exhaust outlet portion 47. The turbocharger 46 is connected to the downstream end of the exhaust outlet portion 47. The exhaust outlet portion 47 includes an exhaust outlet pipe 42 connected to the exhaust outlet port 23, and a branch outlet pipe 43 branched from the exhaust outlet pipe 42. The exhaust outlet pipe 42 extends in the cylinder array direction, and guides exhaust gas to a first turbine 7b of the first turbocharger 7. A first turbine housing 7d in which the first turbine 7b is accommodated is connected to the downstream end of the exhaust outlet pipe 42 in the exhaust flow direction (see FIG. 1). An intra-turbine duct 41 extending in the direction orthogonal to the cylinder array direction is connected to the downstream end of the first turbine housing 7d. A flow rate regulation valve 44, whose opening and closing are controlled by an unillustrated ECU (engine control unit), is provided at an appropriate position of the intra-turbine duct 41.

Further, the downstream end of the intra-turbine duct 41 is connected to the upstream end of a second turbine housing 8d in which a second turbine 8b is accommodated (see FIG.

1). The downstream end of the second turbine housing 8d is connected to the upstream end of the exhaust inlet portion 45a (see FIG. 1, FIG. 2, and FIG. 4). The downstream end of the exhaust inlet portion 45a is connected to the first exhaust gas purification device 12a (see FIG. 1, FIG. 2, and FIG. 4). The exhaust inlet portion 45a extends in the cylinder array direction. Further, the first exhaust gas purification device 12a internally accommodates a diesel oxidation catalyst (DOC).

Further, the downstream end of the first exhaust gas purification device 12a is connected to the upstream end of the purification device connecting portion 45b (see FIG. 1 to FIG. 4). The downstream end of the purification device connecting portion 45b is connected to the second exhaust gas purification device 12b. Further, the downstream end of the second exhaust gas purification device 12b is connected to the upstream end of the flexible exhaust pipe connecting portion 45c (see FIG. 1 to FIG. 4). The downstream end of the flexible exhaust pipe connecting portion 45c is connected to a flexible exhaust pipe 26. The second exhaust gas purification device 12b internally accommodates a diesel particulate filter (DPF).

As illustrated in FIG. 1 and FIG. 4, the downstream end of the branch outlet pipe 43 in the exhaust flow direction is connected to the upstream end of the second turbine housing 8d (see FIG. 1). The downstream end of the second turbine housing 8d is connected to the exhaust inlet portion 45a. The exhaust inlet portion 45a is disposed on the extension of a second shaft 8c. The branch outlet pipe 43 has a curved shape to change the exhaust flow direction from the cylinder array direction to the direction orthogonal to the cylinder array direction.

As illustrated in FIG. 1 and FIG. 4, the first turbocharger 7 is disposed on the front end of the engine body 1, and is connected to the downstream end of the exhaust outlet pipe 42. The first turbocharger 7 includes the first compressor 7a for compressing intake air introduced from the compressor upstream pipe 16, the first turbine 7b to be driven by exhaust gas introduced from the exhaust outlet pipe 42, a first shaft 7c (corresponding to a first shaft of the present invention) for synchronously and rotatably connecting the first compressor 7a and the first turbine 7b, the first turbine housing 7d (see FIG. 1) for covering the outer periphery of the first turbine 7b, the first compressor housing 7e (see FIG. 1) for covering the outer periphery of the first compressor 7a, and a first center housing 7f (see FIG. 1) which rotatably supports the first shaft 7c and covers the outer periphery of the first shaft 7c. The first turbine 7b is fixed to the first shaft 7c, and is located on the extension of the downstream-side exhaust port portion 22.

The first turbocharger 7 is driven by energy of exhaust gas drawn out from the exhaust outlet port 23 in a state that the flow rate regulation valve 44 is opened. On the other hand, the first turbocharger 7 is stopped because exhaust gas does not flow through the intra-turbine duct 41 in a state that the flow rate regulation valve 44 is closed. The first turbocharger 7 is a supercharger which supercharges intake air mainly when the engine is in a middle to high speed range. The first turbocharger 7 is configured such that the capacity thereof is larger than the capacity of the second turbocharger 8.

The first center housing 7f illustrated in FIG. 1 is installed in such a manner that the first center housing 7f is disposed between the first compressor housing 7e and the first turbine housing 7d so that the first compressor housing 7e and the first turbine housing 7d are integrally connected to each other. As illustrated in FIG. 1, the first turbocharger 7 is installed in such a manner that the first shaft 7c (a rotational shaft) extends in the direction orthogonal to the cylinder array direction (in the example illustrated in FIG. 1, in the vehicle width direction) on the engine front side.

As illustrated in FIG. 1 and FIG. 4, the second turbocharger 8 is disposed on the front end of the engine body 1, and is connected to the first turbocharger 7 via the intra-turbine duct 41. The second turbocharger 8 includes the second compressor 8a for compressing intake air introduced from the intake inlet pipe 14, the second turbine 8b to be driven by exhaust gas introduced from the branch outlet pipe 43 and exhaust gas introduced from the intra-turbine duct 41, the second shaft 8c (corresponding to a second shaft of the present invention) for synchronously and rotatably connecting the second compressor 8a and the second turbine 8b, a second turbine housing 8d (see FIG. 1) for covering the outer periphery of the second turbine 8b, the second compressor housing 8e for covering the outer periphery of the second compressor 8a, and a second center housing 8f (see FIG. 1) which rotatably supports the second shaft 8c and covers the outer periphery of the second shaft 8c. As illustrated in FIG. 1 and FIG. 4, the second turbine 8b is fixed to the second shaft 8c, and is located on the extension of the first shaft 7c.

The second center housing 8f illustrated in FIG. 1 is configured in such a manner that the second center housing 8f is disposed between the second compressor housing 8e and the second turbine housing 8d so that the second compressor housing 8e and the second turbine housing 8d are integrally connected to each other. As illustrated in FIG. 1, the second turbocharger 8 is disposed on the exhaust port side than the first turbocharger 7 in the direction orthogonal to the cylinder array direction (in the example illustrated in FIG. 1, on the right side in the vehicle width direction), and the second shaft 8c (a rotational shaft) is disposed to extend in the cylinder array direction (in the example illustrated in FIG. 1, in the vehicle front-rear direction) on the engine front side.

The second turbocharger 8 is driven by energy of exhaust gas introduced from the exhaust outlet port 23 to the second turbocharger 8 via the branch outlet pipe 43, and by energy of exhaust gas introduced from the exhaust outlet port 23 to the second turbocharger 8 via the exhaust outlet pipe 42 and via the intra-turbine duct 41 in a state that the flow rate regulation valve 44 is opened. Further, the second turbocharger 8 is driven by energy of exhaust gas introduced to the second turbocharger 8 via the branch outlet pipe 43 in a state that the flow rate regulation valve 44 is closed. The second turbocharger 8 is a compact supercharger for supercharging intake air mainly when the the engine is in a low speed range.

As illustrated in FIG. 1 to FIG. 4, the first exhaust gas purification device 12a is disposed to extend in the cylinder array direction along an exhaust-side lateral surface of the cylinder head 3 (see FIG. 2) (in the example illustrated in FIG. 4, the right surface of the cylinder head 3 in the vehicle width direction). The second exhaust gas purification device 12b is disposed to extend in the up-down direction on the downstream side of the first exhaust gas purification device 12a in the exhaust flow direction along the exhaust-side lateral surface of the cylinder block 2. The flexible exhaust pipe 26 is disposed on the downstream side of the second exhaust gas purification device 12b in the exhaust flow direction along the exhaust-side lateral surface of the cylinder block 2, and is disposed in an obliquely downwardly inclined state in such a manner that the upstream end of the flexible exhaust pipe 26 in the exhaust flow direction is located on the upper side than the downstream end of the flexible exhaust pipe 26 in the exhaust flow direction.

As illustrated in FIG. 1, the lateral exhaust pipe 45 is a duct connected to the turbine housing 8d of the second supercharger 8, and disposed along the exhaust-side lateral surface 29 of the engine body 1 in the cylinder array direction. The first exhaust gas purification device 12a, the second exhaust gas purification device 12b, and the flexible exhaust pipe 26 are provided on the lateral exhaust pipe 45 in the order from the upstream side in the exhaust flow direction. Specifically, as illustrated in FIG. 1 to FIG. 4, the lateral exhaust pipe 45 includes, in the order from the upstream side in the exhaust flow direction, the exhaust inlet portion 45a for introducing exhaust gas into the first exhaust gas purification device 12a, the purification device connecting portion 45b disposed between the first exhaust gas purification device 12a and the second exhaust gas purification device 12b and configured to connect the first exhaust gas purification device 12a and the second exhaust gas purification device 12b, and the flexible exhaust pipe connecting portion 45c disposed between the second exhaust gas purification device 12b and the flexible exhaust pipe 26 and configured to connect the second exhaust gas purification device 12b and the flexible exhaust pipe 26.

The ECU is a microprocessor constituted by a CPU, an RAM, and an ROM. An input terminal of the ECU is connected to an accelerator pedal position sensor (not illustrated) for detecting an amount of depression of an accelerator pedal, and a crank angle sensor (not illustrated) for detecting a rotational angle of a crankshaft. An output terminal of the ECU is connected to an actuator (not illustrated) of the flow rate regulation valve 44. The ECU determines an operating state of the engine body 1 such as an engine speed and an engine load on the basis of information to be input from the accelerator pedal position sensor and from the crank angle sensor, and controls opening and closing of the flow rate regulation valve 44 on the basis of a determination result by the ECU.

Next, an example of an operation of the exhaust device for a supercharged engine according to the embodiment is described.

The ECU controls the flow rate regulation valve 44 to open when it is judged that the engine is in a middle to high speed range (a state that the engine speed exceeds a predetermined value) and is in a high load state on the basis of information to be input from the accelerator pedal position sensor and from the crank angle sensor. By this control, exhaust gas is allowed to low to the intra-turbine duct 41 and to the branch outlet pipe 43. Then, the first turbine 7a and the second turbine 8b are driven. As a result, intake air is compressed by the first compressor 7a and by the second compressor 8a, and compressed intake air is supplied to the engine body 1 via the intake manifold 10 (dual stage supercharging).

On the other hand, the ECU controls the flow rate regulation valve 44 to close when it is judged that the engine is in a low speed range (a state that the engine speed is not larger than the predetermined value) and is in a high load state on the basis of information to be input from the accelerator pedal position sensor and from the crank angle sensor. By this control, exhaust gas is not allowed to flow to the intra-turbine duct 41, but is allowed to flow to the branch outlet pipe 43. Therefore, only the second turbine 8b out of the first turbine 7a and the second turbine 8b is driven. As a result, intake air is compressed by the second compressor 8a, and compressed intake air is supplied to the engine body 1 via the intake manifold 10 (single stage supercharging).

(Advantageous Effects of First Embodiment)

In the embodiment, the first turbocharger 7 and the second turbocharger 8 are disposed at the front end of the engine body 1 in the cylinder array direction. This makes it possible to secure a large space on the exhaust-side lateral surface of the engine body 1 in the cylinder array direction. Therefore, it is possible to secure a sufficient space for installing the exhaust gas purification device 12 and the lateral exhaust pipe 45 on the exhaust-side lateral surface of the engine body 1, to dispose the exhaust gas purification device 12 and the lateral exhaust pipe 45 in the space, and to sufficiently secure the sum L (see FIG. 2) of the length of the exhaust gas purification device 12 and the length of the lateral exhaust pipe 45. Further, disposing the exhaust gas purification device 12 along the lateral surface of the engine body 1 makes it possible to shorten the distance between the engine body 1 and the exhaust gas purification device 12 to thereby prevent lowering of the temperature of exhaust gas. As a result, the exhaust gas purification device 12 can exhibit a sufficient purification performance. Furthermore, it is possible to install the exhaust gas purification device 12 within the engine room. This is advantageous in avoiding reduction of the space for a vehicle compartment.

Further, in the embodiment, dual stage supercharging is performed by the first and second superchargers 7 and 8. This is advantageous in enhancing the supercharging performance. Furthermore, it is possible to prevent lowering of the temperature of exhaust gas before the exhaust gas reaches the first exhaust gas purification device 12a from the exhaust outlet port 23. This is advantageous in enhancing the purification performance of the first exhaust gas purification device 12a.

Specifically, in a supercharger, exhaust gas flowing to a turbine housing in a direction orthogonal to the axis direction of the turbine housing flows along the inner wall surface of the turbine housing, and thereafter, is discharged from the center portion of the turbine housing in the axis direction of the turbine housing. Therefore, the exhaust flow direction when exhaust gas exits from the supercharger is changed at a right angle with respect to the exhaust flow direction when exhaust gas enters the supercharger without causing exhaust gas to impinge against the inner wall surface of the turbine housing. Accordingly, as illustrated in FIG. 1 and FIG. 4, disposing the first turbocharger 7 and the second turbocharger 8 in such a manner that the shaft direction of the first turbocharger 7 and the shaft direction of the second turbocharger 8 orthogonally intersect with each other, and forming a U-shaped exhaust passage (see FIG. 4) including the exhaust pipes 42, 41, and 45a between the exhaust outlet port 23 of the engine body 1 and the first exhaust gas purification device 12a makes it possible to guide exhaust gas from the exhaust outlet port 23 to the first exhaust gas purification device 12a substantially without forming curved portions in the exhaust pipes 42, 41, and 45a between the exhaust outlet port 23 and the first exhaust gas purification device 12a. As described above, it is not necessary to form curved portions in the exhaust pipes 42, 41, and 45a. This is advantageous in suppressing heat radiation from the exhaust pipes 42, 41, and 45a, and in making the exhaust pipes 42, 41, and 45a in a compact and simplified manner (in the case of dual stage supercharging).

Further, in the embodiment, the first exhaust gas purification device 12a is disposed to extend in the cylinder array direction, and the second exhaust gas purification device 12b is disposed to extend in the up-down direction on the downstream side of the first exhaust gas purification device 12a in the exhaust flow direction. Therefore, it is possible to secure the capacity of each of the first exhaust gas purification device 12a and the second exhaust gas purification device 12b, while avoiding interference of the first exhaust gas purification device 12a and the second exhaust gas purification device 12b with the other members in the engine room (e.g. a steering shaft 40 illustrated in FIG. 2).

Further, in the embodiment, the exhaust port 11 formed in the cylinder head 3 has a function of an exhaust manifold. This is advantageous in making the exhaust device compact, as compared with a configuration, in which an exhaust passage independent of a cylinder head 3 is mounted on a lateral surface of the cylinder head 3 as an exhaust manifold.

(Second Embodiment)

Figure 5:
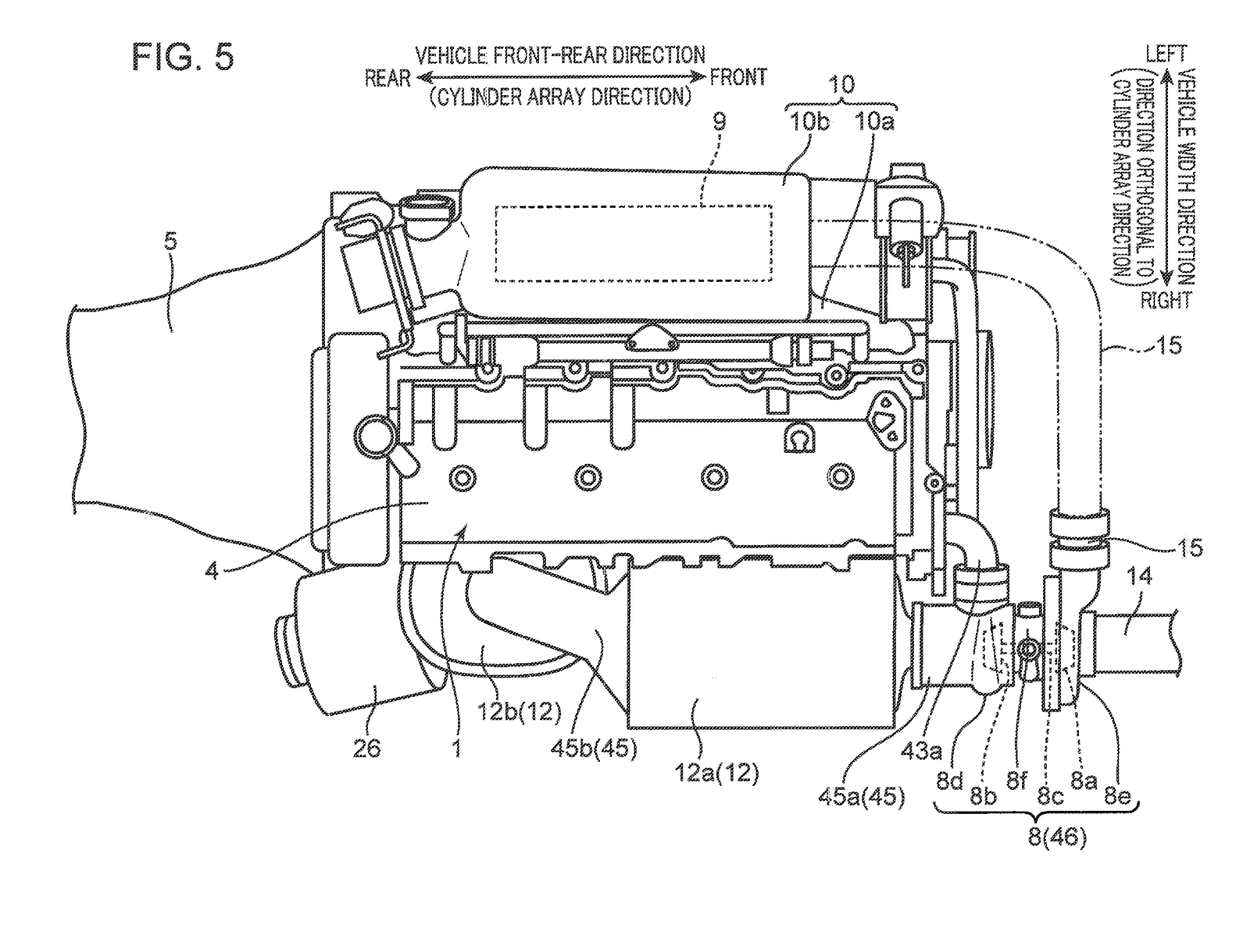
FIG. 5 is a plan view illustrating an exhaust device for a supercharged engine according to a second embodiment of the present invention.

Next, the second embodiment of the present invention is described referring to FIG. 5.

An exhaust device for a supercharged engine according to the second embodiment is provided only with a second turbocharger 8 as a supercharger, whereas the exhaust device according to the first embodiment is provided with the first turbocharger 7 and the second turbocharger 8. Therefore, in the second embodiment, dual stage supercharging is not performed, and single stage supercharging by the second turbocharger 8 is performed. In this configuration, exhaust gas drawn out from an exhaust outlet port 23 always passes through a curved branch outlet pipe 43. Therefore, although the second embodiment may be disadvantageous in terms of heat radiation as compared with the first embodiment, it is possible to secure a sufficient space for installing an exhaust gas purification device 12 and a lateral exhaust pipe 45 on an exhaust-side lateral surface of an engine body 1 substantially in the same manner as the first embodiment.

(Third Embodiment)

Figure 6:
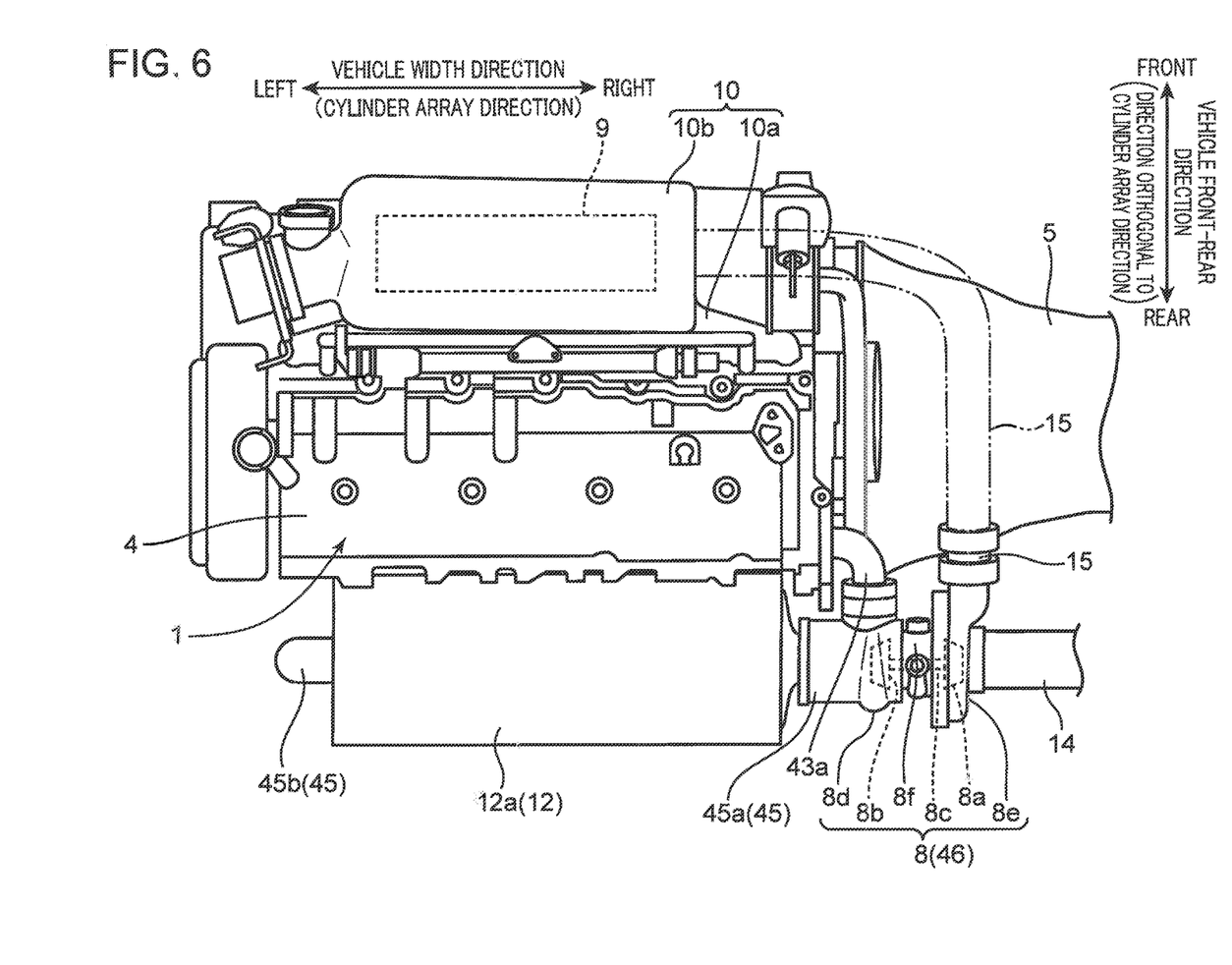
FIG. 6 is a plan view illustrating an exhaust device for a supercharged engine according to a third embodiment of the present invention.
Figure 7:
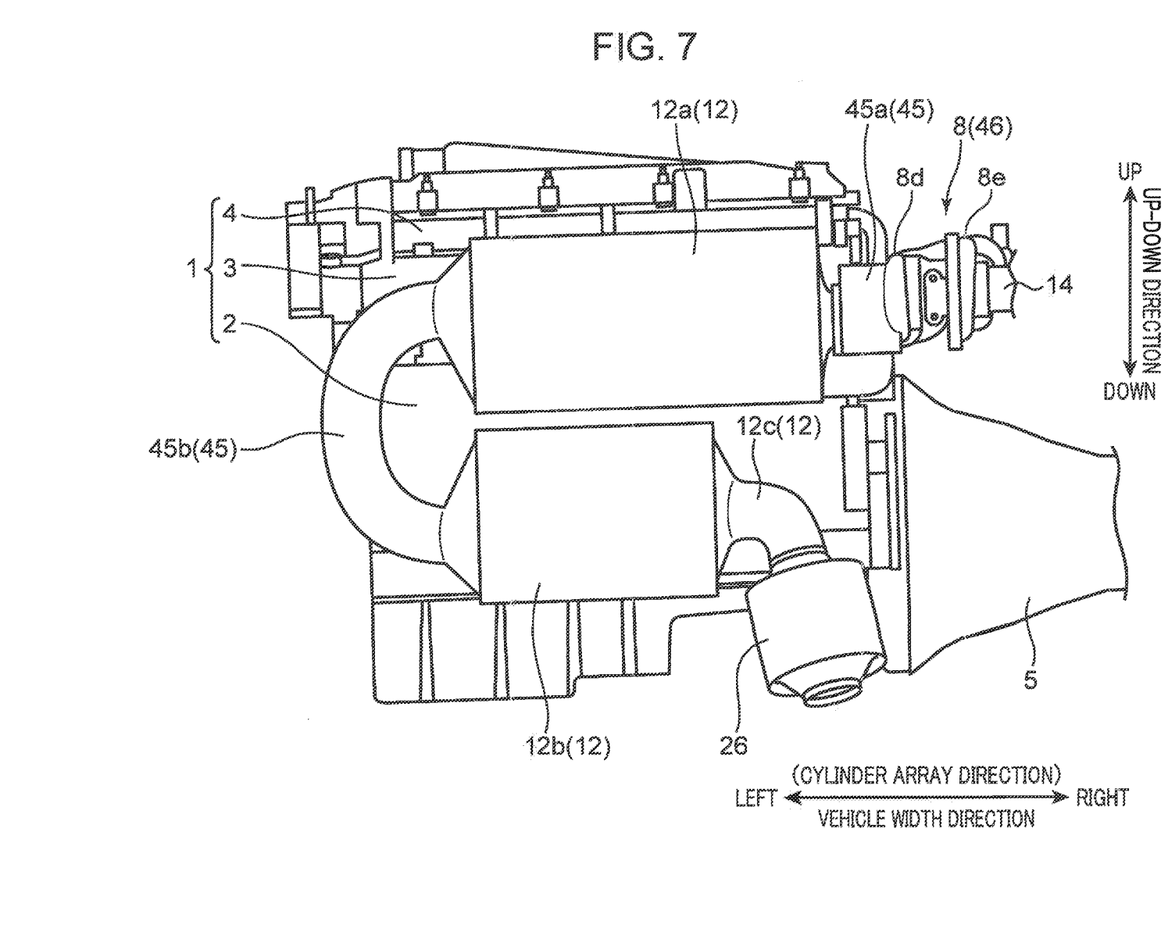
FIG. 7 is a side view of the exhaust device for a supercharged engine according to the third embodiment of the present invention when viewed from exhaust side.

Next, the third embodiment of the present invention is described referring to FIG. 6 and FIG. 7.

In the third embodiment, an engine body 1 is disposed in such a manner that the cylinder array direction of the engine body 1 is aligned with the vehicle width direction. Further, an exhaust device according to the third embodiment is provided only with a second turbocharger 8 as a supercharger, whereas the exhaust device according to the first embodiment is provided with the first turbocharger 7 and the second turbocharger 8. Furthermore, a second exhaust gas purification device 12b is disposed in parallel to a first exhaust gas purification device 12a in a state that the second exhaust gas purification device 12b extends in the cylinder array direction below the first exhaust gas purification device 12a.

Also in this configuration, exhaust gas drawn out from an exhaust outlet port 23 always passes through a curved branch outlet pipe 43. Therefore, although the third embodiment may be disadvantageous in terms of heat radiation as compared with the first embodiment, it is possible to secure a sufficient space for installing an exhaust gas purification device 12 and a lateral exhaust pipe 45 on an exhaust-side lateral surface of the engine body 1 substantially in the same manner as the first embodiment.

(Modifications)

Each of the embodiments is applied to a diesel engine. Alternatively, the present invention may be applied to a gasoline engine.

Further, in the embodiments, the exhaust port 11 formed in the cylinder head 3 has a function of an exhaust manifold. Alternatively, an exhaust passage independent of a cylinder head 3 may be mounted on a lateral surface of the cylinder head 3 as an exhaust manifold.

Further, in the embodiments, the intercooler 9 is accommodated in the intake manifold 10. Alternatively, the intercooler 9 may be disposed at a position different from the position of the intake manifold 10.

<Summary of Embodiments>

The following is a summary of the features and the advantageous effects of the exhaust device for a supercharged engine disclosed in the embodiments.

The exhaust device for a supercharged engine disclosed in the embodiments is an exhaust device configured to flow exhaust gas to be discharged from each of a plurality of cylinders of an engine body. The engine body includes the cylinders arrayed in a row. The exhaust device includes an exhaust passage extending in the cylinder array direction; an exhaust outlet portion connected to an end of the exhaust passage in the cylinder array direction; a supercharger disposed at an end of the engine body in the cylinder array direction, and connected to the exhaust outlet portion; a lateral exhaust pipe connected to the supercharger, and disposed along a lateral surface of the engine body in the cylinder array direction; and an exhaust gas purification device disposed midway in the lateral exhaust pipe.

The exhaust passage in the exhaust device includes both of an exhaust passage to be connected to a lateral wall of the engine body (i.e. the cylinder head), and an exhaust passage to be formed in the engine body.

In the exhaust device, the supercharger is disposed at the end of the engine body in the cylinder array direction. This makes it possible to secure a large space along the lateral surface of the engine in the cylinder array direction. Therefore, it is possible to secure a sufficient space for installing the exhaust gas purification device and the lateral exhaust pipe along the lateral surface of the engine, and to install the exhaust gas purification device and the lateral exhaust pipe in the space. Further, disposing the exhaust gas purification device along the lateral surface of the engine body makes it possible to shorten the distance between the engine body and the exhaust gas purification device. This is advantageous in preventing lowering of the temperature of exhaust gas. As a result, the exhaust gas purification device can exhibit a sufficient purification performance. Furthermore, it is possible to install the exhaust gas purification device within an engine room. This is advantageous in avoiding reduction of the space for a vehicle compartment.

In the exhaust device, preferably, the supercharger may include a first supercharger and a second supercharger. The first supercharger may include a first shaft extending in a direction orthogonal to the cylinder array direction, and a first turbine fixed to the first shaft, located on an extension of the exhaust passage, and configured to be driven by exhaust gas to be discharged from the exhaust outlet portion. The second supercharger may include a second shaft extending in the cylinder array direction, and a second turbine fixed to the second shaft, located on an extension of the first shaft, and configured to be driven by exhaust gas to be discharged from the first supercharger. The lateral exhaust pipe may include an exhaust inlet portion disposed on an extension of the second shaft.

According to the aforementioned configuration, it is possible to enhance the supercharging performance by performing dual stage supercharging by the first and second superchargers. Further, it is possible to prevent lowering of the temperature of exhaust gas before the exhaust gas reaches the exhaust gas purification device from the end of the exhaust passage. This is advantageous in enhancing the purification performance of the exhaust gas purification device. More specifically, there are some causes of lowering the temperature of exhaust gas when the exhaust gas passes through flow channels. The inventors found that one of the main causes is heat radiation from curved portions of exhaust pipes. In view of the above, the inventors came up with the idea of reducing the number of curved portions of exhaust pipes between an exhaust outlet portion and an exhaust gas purification device.

Specifically, in a supercharger, exhaust gas flowing to a turbine housing in the direction orthogonal to the axis direction of the turbine housing flows along the inner wall surface of the turbine housing, and thereafter, is discharged from the center portion of the turbine housing in the axis direction of the turbine housing. Therefore, the exhaust flow direction when exhaust gas exits from the supercharger is changed at a right angle with respect to the exhaust flow direction when exhaust gas enters the supercharger without causing exhaust gas to impinge against the inner wall surface of the turbine housing. Accordingly, disposing the first and second superchargers in such a manner that the shaft direction of one of the superchargers and the shaft direction of the other of the superchargers orthogonally intersect with each other, and forming a U-shaped exhaust passage between an end of the exhaust passage and the exhaust gas purification device makes it possible to guide exhaust gas from the end of the exhaust passage to the exhaust gas purification device substantially without forming curved portions in exhaust pipes between the end of the exhaust passage and the exhaust gas purification device. As described above, it is not necessary to form curved portions in exhaust pipes. This is advantageous in suppressing heat radiation from the exhaust pipes, and in making the exhaust pipes in a compact and simplified manner.

In the exhaust device, preferably, the exhaust gas purification device may include a first exhaust gas purification device carrying an oxidation catalyst, and a second exhaust gas purification device provided with an exhaust particulate filter. The first exhaust gas purification device may be disposed to extend in the cylinder array direction, and the second exhaust gas purification device may be disposed to extend in an up-down direction on a downstream side of the first exhaust gas purification device in an exhaust flow direction.

According to the aforementioned configuration, it is possible to secure a capacity of each of the first and second exhaust gas purification devices, while avoiding interference of the first and second exhaust gas purification devices with the other members in the engine room (e.g. a steering shaft).

In the exhaust device, preferably, the exhaust passage may be forming in a cylinder head of the engine body.

According to the aforementioned configuration, it is possible to make the exhaust device compact, as compared with a configuration, in which an exhaust passage is mounted on an outer wall surface of a cylinder head.

This application is based on Japanese Patent Application No. 2015-185171 filed on Sep. 18, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An exhaust device for a supercharged engine, the exhaust device configured to flow exhaust gas to be discharged from each of a plurality of cylinders of an engine body, the engine body including the plurality of cylinders arrayed in a row in a cylinder array direction, the exhaust device comprising:
    an exhaust passage extending in the cylinder array direction;
    an exhaust outlet portion connected to an end of the exhaust passage in the cylinder array direction;
    a supercharger disposed at an end of the engine body in the cylinder array direction, and connected to the exhaust outlet portion;
    a lateral exhaust pipe connected to the supercharger, and disposed along a lateral surface of the engine body in the cylinder array direction; and
    an exhaust gas purification device disposed midway in the lateral exhaust pipe along a lateral surface of the engine body, wherein
    the supercharger includes a first supercharger and a second supercharger,
    the first supercharger includes a first shaft extending in a direction orthogonal to the cylinder array direction, and a first turbine fixed to the first shaft, located on an extension of the exhaust passage, and configured to be driven by exhaust gas to be discharged from the exhaust outlet portion,
    the second supercharger includes a second shaft extending in the cylinder array direction, and a second turbine fixed to the second shaft, located on an axis of the first shaft, and configured to be driven by exhaust gas to be discharged from the first supercharger, and
    the lateral exhaust pipe includes an exhaust inlet portion disposed on an axis of the second shaft.

2. The exhaust device for a supercharged engine according to claim 1, wherein
    the exhaust gas purification device includes a first exhaust gas purification device carrying an oxidation catalyst, and a second exhaust gas purification device provided with an exhaust particulate filter,
    the first exhaust gas purification device is disposed to extend in the cylinder array direction, and
    the second exhaust gas purification device is disposed to extend in an up-down direction on a downstream side of the first exhaust gas purification device in an exhaust flow direction.

3. The exhaust device for a supercharged engine according to claim 1, wherein
    the exhaust passage is formed in a cylinder head of the engine body.

4. An exhaust device for a supercharged engine, the exhaust device configured to flow exhaust gas to be discharged from each of a plurality of cylinders of an engine body, the engine body including the plurality of cylinders arrayed in a row in a cylinder array direction, the exhaust device comprising:
    an exhaust passage extending in the cylinder array direction;
    an exhaust outlet portion connected to an end of the exhaust passage in the cylinder array direction;
    a supercharger disposed at an end of the engine body in the cylinder array direction, and connected to the exhaust outlet portion;
    a lateral exhaust pipe connected to the supercharger, and disposed along a lateral surface of the engine body in the cylinder array direction; and
    an exhaust gas purification device disposed midway in the lateral exhaust pipe, wherein
    the supercharger includes a first supercharger and a second supercharger, the first supercharger includes a first shaft extending in a direction orthogonal to the cylinder array direction, and a first turbine fixed to the first shaft, located on an extension of the exhaust passage, and configured to be driven by exhaust gas to be discharged from the exhaust outlet portion, the second supercharger includes a second shaft extending in the cylinder array direction, and a second turbine fixed to the second shaft, located on an axis of the first shaft, and configured to be driven by exhaust gas to be discharged from the first supercharger, and the lateral exhaust pipe includes an exhaust inlet portion disposed on an axis of the second shaft.

* * * * *